United States Patent [19]

Nedriga

[11] Patent Number: 5,047,891

[45] Date of Patent: Sep. 10, 1991

[54] SURGE ARRESTER CORE

[75] Inventor: Walter N. Nedriga, Savannah, Ga.

[73] Assignee: IDSI Products of Georgia, Savannah, Ga.

[21] Appl. No.: 554,703

[22] Filed: Jul. 18, 1990

[51] Int. Cl.[5] .................... H02H 9/04

[52] U.S. Cl. .................... 361/117; 361/127; 361/126; 338/21

[58] Field of Search .................... 361/111, 117, 126, 127; 174/30; 338/20, 21; 313/231.11; 138/123, 124, 125

[56] References Cited

U.S. PATENT DOCUMENTS 4,656,555 4/1987 Raudabaugh .................... 361/117
4,905,118 2/1990 Sakic .................... 361/117
4,930,039 5/1990 Woodworth .................... 361/127

*Primary Examiner*—A. D. Pellinen
*Assistant Examiner*—C. Schultz
*Attorney, Agent, or Firm*—Willard M. Hanger

[57] ABSTRACT

A non-fragmenting surge arrester core comprising a conductive core comprising a series array of non-linear resistor elements stacked in face-to-face contact between the inner end faces of a pair of terminal end pieces encased within a plastic impregnated jacket of bi-directional weave fabric woven of high tensile strength strands of which the strands of one of the bi-directional orientations have a greater tensile strength than the strands of the other bi-directional orientation with the greater strength fabric strands aligned lengthwise of the jacket. A tensioned constrictive hoop of high tensile strength material compressively circumscribes a portion of the jacket weave fabric overlying a peripheral area of the terminal end pieces between its two end faces, which peripheral area preferably conforms to a curvelinear depression groove circumscribing the terminal end pieces.

11 Claims, 1 Drawing Sheet

SURGE ARRESTER CORE

FIELD OF THE INVENTION

This invention relates to an integratal surge arrester core of non-linear resistor units encased within plastic material reinforced in a manner as will prevent destructive fragmentation when subjected to abnormal voltage surges and particularly useful as a standardized core adaptable for insertion into a variety of surge arrester weatherproof, insulator housings.

Many varieties of surge arresters are in use connected between an electrical power line or piece of electrical equipment and the ground as safety devices to shunt to ground high current resulting from high voltage power surges such as created by lightning. The shunting circuit of these surge arresters comprises an elongated core between the terminal ends of which are stacked a variety of non-linear resistor elements which commonly comprise metal oxide varistor blocks stacked in series with or without intervening metal spacer heat sink blocks, a variety of electrical components and compressed springs. The conductive cores of non-linear resistor elements are normally enclosed within an outer, weatherproof, insulating housing of which porcelain and plastic material of various types are commonly used.

A continuing problem with prior art surge arresters has been explosive fragmentation of the arresters due to extremely high pressures generated within the core of non-linear resistor elements by the heat generated by the passage of high shunting currents through the resistor core when usually high voltage surges are generated by lightning or other phenomena. The high pressures generated within the core are the result of the heating of contained gases or air and the vaporization of core metal elements and the adhesive used to maintain the faces of the varistor blocks in contact. Many solutions have been attempted, such as installing reinforced metal bands around the outer, weatherproof insulating housing, circumscribing the varistors with heat conducting electrically insulating collars maintained in contact with the outer housing to dissipate the heat in the manner of U.S. Pat. No. 4,218,721, incorporating end pressure relief diaphragms at the ends of the arrester cores in the manner of U.S. Pat. No. 4,404,614, incorporating relatively large numbers of metal blocks into the core as heat sink sources absorbing the generated heat, fabricating the outer housings of the conductive core from resilient and high impact resist polymers which are fragmenting resistant of which aforesaid U.S. Pat. No. 4,404,614 is typical, encasing the non-linear resistor elements and terminal end connections within a rigid shell of resin impregnated, high-strength material which is enclosed within an outer housing of elastomeric or plastic heat shrink material under vacuum to remove all internal gases in the manner of U.S. Pat. No. 4,851,955 and various other measures intended to contain or prevent fragmentation.

All such solutions have not been completely satisfactory for many reasons, a primary one being high costs due to a complex structure of the interior conductive core and integrated outer housing. Although outer housings of resilient, high impact resistant polymers are non-fragmenting in themselves, these housings will not contain the core varistor and metal fragments impelled outwardly at high velocities upon an explosive fragmentation of a core within which extremely high pressures are quickly generated by sudden voltage surges. Typical examples of surge arresters in which the core of non-linear resistor elements encased within a jacket of resin impregnated, high strength material is enclosed within a "shatterproof" housing are U.S. Pat. Nos. 4,404,614 and 4,851,955. In these patents, the core of non-linear resistor elements stacked between terminal ends are encased within a jacket of resin impregnated, high strength fiberglass material and the encased conductive core is enclosed within a weatherproof insulated housing of elastomeric material. Although the cylindrical resin impregnated fiberglass jacket encasing the stacked resistor elements and the end terminals provides an encasing shell of considerable circumferential bursting strength, the longitudinal integrity of the core encasing shell is dependent upon the shear strength of the bonding between the jacket and the core elements in preventing a separation between the two ends of the core. In U.S. Pat. No. 4,404,614 the core encasing sleeve is bonded only to the terminal ends of the core, the longitudinal integrity of the core shell being dependent upon the shear strength of the relatively small area of bonding between the encasing jacket and the underlying terminal ends. Probably in recognition of this, a pressure relief diaphragm was incorporated at the end of the core. In U.S. Pat. No. 4,851,955 the encasing jacket is bonded along its entire length to the underlying resistor element array and the end terminals of similar circumferential dimensions between which the resistor elements are stacked. The circumferential bursting integrity of the fully bonded encasing jacket is considerable, but the longitudinal integrity is dependent upon the lower shear strength of the bonding between the encasing jacket shell and the underlying core elements. Although the integrity of the encasing shell would be somewhat greater than in the embodiment of U.S. Pat. No. 4,404,614, a sufficiently high pressure surge generated within the core of U.S. Pat. No. 4,851,955 would generate longitudinal pressure between the resistor blocks and the terminal ends as would shear the bonding between the jacket and the underlying core elements and blow apart the two ends in a manner as would explosively scatter fragments of core resistive elements. The integrity of the surge arrester structure of U.S. Pat. No. 4,851,955 is indicated to be dependent upon the voidless interior established by the manner in which the arrester structure is assembled under vacuum. However, the voidless created interior of the disclosed arrester would not prevent the generation of high internal pressures from the vaporization of the metal in the heat sinks and the metal adhesive on the varistor block faces that would be created by an extremely high shunting current flow through the core when subjected to abnormally great voltage surges. Hence, it would be virtually impossible to preserve the integrity of the core encasement of this patent under conditions of all possible high voltage surges.

SUMMARY OF THE INVENTION

This invention provides an improved non-fragmenting surge arrester core in which non-linear resistor elements and terminal end pieces, between the inner end faces of which the resistor elements are stacked, are contained within and bonded to an encasing jacket fabricated of high strength material of a nature as will first split as a narrow slit in the jacket between the terminal end pieces upon abnormally high pressures being generated within the core and safely vent the gas created pressure before the longitudinal component of the internal gas pressure reaches such destructive intensity as to blow the resistor elements and core terminal end pieces apart. The material of the core jacket overlying and bonded to the peripheral surfaces of the resistor elements and the terminal end pieces is a plastic impregnated, electrically insulating, bi-directional weave material woven of high tensile strength strands, such as fiberglass, in which the strands extending along one direction of the fabric have a total tensile strength greater than the strands of the other fabric direction with the higher tensile strength strands of the core jacket weave material extend longitudinally of the core. A constrictive hoop of high tensile strength material compressively circumscribes a portion of the jacket material overlying a peripheral area of each terminal end piece between its outer and inner end faces. In the disclosed preferred embodiments this peripheral terminal end piece area is furrowed to establish a circumferentially extending curvelinear grooved region of moderate curvature. The peripheral constrictive hoop compressively anchors the higher strength longitudinally extending fabric strands onto the terminal end pieces so that the stresses imposed on the jacket fabric by the longitudinal component of the core internally generated pressure, tending to separate and blow apart the core components, are transmitted to and restrained by the longitudinal strands of greater strength with the transverse component of the internal forces being restrained by the weaker circumferential strands. This results in abnormally high pressures generated within the core causing a portion of the circumferentially extending jacket material strands extending between the longitudinally extending strands to fracture which establishes a narrow slit between adjacent longitudinal strands of the jacket material through which the abnormally high pressure is safely vented before fragmentation of the core can occur. Since the disclosed integral jacket enclosed core provides non-fragmentation features in surge arresters having a wide variety of outer housings, it has great adaptability as a standard, low-cost core unit providing non-fragmentation features for a wide variety of surge arresters.

The object of this invention is to provide a core for a surge arrester which will not fragment when an abnormally high internal pressure is generated by abnormally high voltage surges.

Another object of the invention is to provide a shell-encased core for a surge arrester in which the shell will vent high temperature gases generated by the core by abnormally high current surges prior to explosive disintegration of the core.

Still a further object of the invention is to provide a low cost, non-fragmenting surge arrester core of standard design which can be housed in a wide variety of weatherproof insulating surge arrester housings.

DESCRIPTION OF THE PREFERRED EMBODIMENTS

Figures 1, 2:
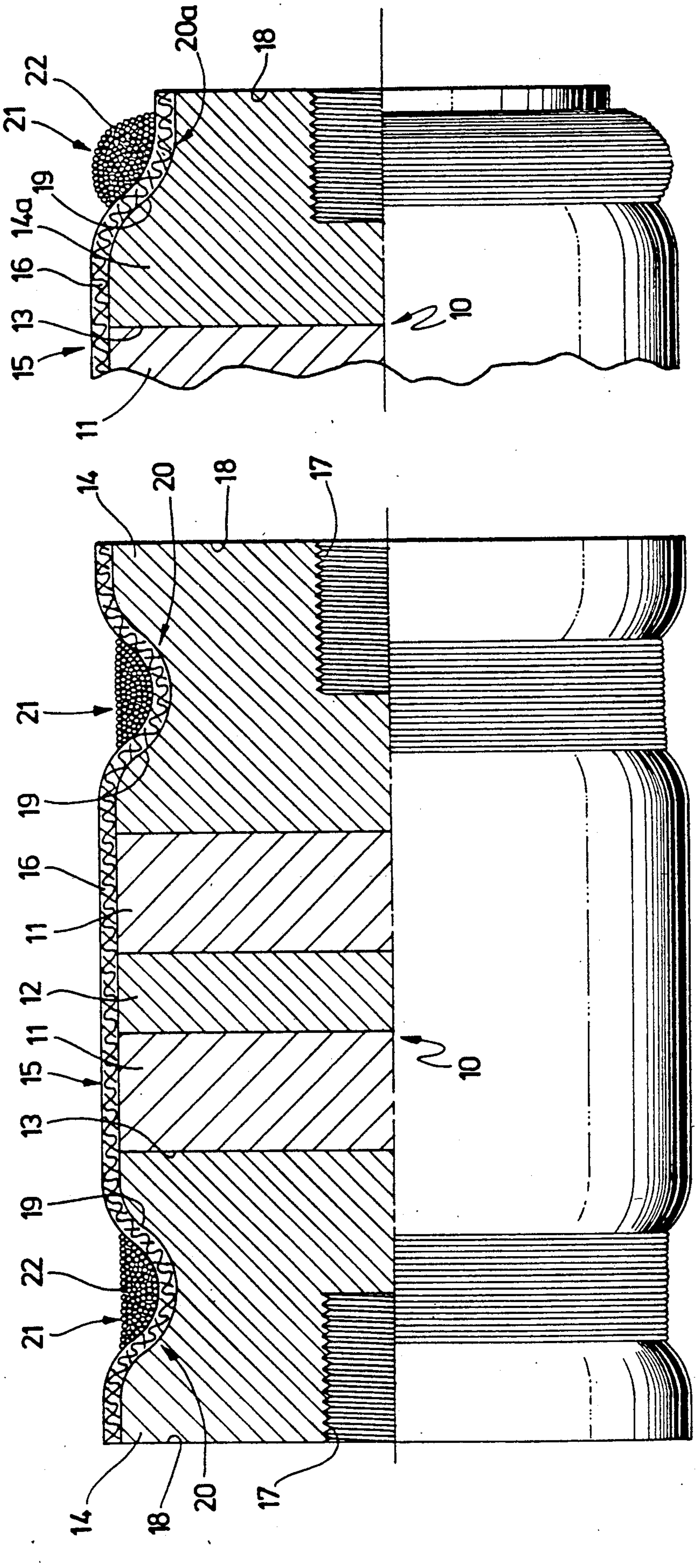
FIG. 1 is a side elevation in partial section of a surge arrester core with terminal end pieces of one preferred embodiment.
FIG. 2 is a partial side elevation in partial section of a surge arrester core similar to FIG. 1 with a terminal end piece of a second preferred embodiment.

Referring to FIG. 1, the surge arrester core of the invention comprises a conductive core array 10 of non-linear resistor elements, typically metal oxide varistor blocks 11 and metal heat sink, spacer blocks 12, stacked in face-to-face contact between the inner end faces 13 of a pair of terminal end pieces 14 and encased within a jacket 15 of plastic impregnated bi-directional weave fabric 16 bonded to the outer peripheral surfaces of the underlying non-linear resistor array of varistor blocks 11 and metal spacer blocks 12 and to the peripheral surface of each of the terminal end pieces 14 into the interior of which a threaded bore 17 extends from the outer terminal end face 18 for insertion of threaded connections (not illustrated) to opposite electrical polarities. The perimeter of an outer portion of each terminal end piece 14 between the outer end face 18 and the inner end face 13 has a circumferentially extending, curvelinear furrowed surface 19 of moderate curvature creating a circumferentially extending depression groove 20. A tensioned constrictive band 21 or hoop extends circumferentially of each terminal end piece to compressively overly the portions of the weave fabric 16 overlying the terminal depression grooves 20, the constrictive hoop 21 most conveniently comprising one or more continuous lengths of high tensile strength strands 22 wound under tension around the periphery of the jacket 15 overlying the terminal end piece depression groove 20 in an overlying winding relationship. The terminal end pieces are metal or any conductive material.

The embodiment of FIG. 2 conforms essentially to that of FIG. 1 of a conductive core array 10 including varistor blocks 11 and other conductive core elements (not illustrated) stacked in face-to-face contact between the inner end faces 13 of the terminal end pieces 14*a* and encased within a jacket 15 of plastic impregnated, bi-directional weave fabric 16 with a constrictive band 21 of high tensile strength strands 22 wound around the periphery of the depression groove 20*a* of the terminal end piece 14*a* in compressively overlying the portion of the weave fabric 16 overlying the curvelinear terminal end piece depression groove 20*a*. As is readily apparent, the only difference between the embodiments of FIGS. 1 and 2 is that the depression groove 20*a* terminating at the outer face 18 of the terminal end piece 14*a* and defined by the curvelinear surface 19 of moderate curvature is a foreshortened version of the depression groove 20 of the terminal end piece 14 omitting the outer half of the depression groove 20 of FIG. 1. The terminal end piece depression groove 20 and 20*a* of both illustrated embodiments is a surface of revolution generated along a curvelinear surface line 19 of moderate curvature, of which an optimum suitable radius of curvature or arc has been found to be 0.150. As is evident from viewing FIGS. 1 and 2, to maximize the degree to which the internal core pressure forces tending to push apart the terminal end pieces are restrained by the stress imposed in the longitudinal fabric strands of the overlying jacket, a significant portion of the region of the fabric strands underlying the constrictive hoop in the depression groove should lie obliquely of the core longitudinal axis and involve a gradual change in fabric strand direction to avoid high stress concentrations. If a sufficient degree of compressive force is established by the terminal end piece circumscribing hoop, a minimal depth terminal end piece depression groove is necessary, or in some instances might be eliminated at the expense of a lower degree of fragmentation integrity.

As previously explained, an essential feature of the invention is the weave pattern of the sleeve bi-directional weave fabric 16 and the orientation of the strands of the bi-directional weave fabric in the jacket. The weave pattern of the bi-directional fabric 16 must be such that the strands comprising one linear dimension of the bi-directional weave fabric, e.g., warp, have a tensile strength greater than that of the strands comprising the other linear dimension, e.g., weft, or fill, and the orientation of the weave fabric 16 in the jacket 15 is such that the fabric higher strength component, e.g., warp, extends longitudinally of the jacket 15, the weaker component of the bi-directional fabric 16, e.g., fill, extending circumferentially of the encasing jacket 15. A preferred embodiment of the bi-directional weave fabric comprises fiberglass strands woven into a bi-directional weave of a majority of strands in the warp direction. A highly suitable bi-directional fiberglass fabric pre-impregnated with a polyester resin is fabric style 3743 of 48 warp and 30 fill strands produced by Hexcel Corporation of Dublin, California, establishing a warp-to-fill ratio of 62/38. A bi-directional weave fabric of lesser ratio of warp-to-fill, such as 55/45 or lower, could be utilized at the expense of lowering the longitudinal integrity of the sleeve. The jacket longitudinal integrity depending to some degree upon the quality of the weave strands, a reasonable minimal safe ratio of strength components of the bi-directional weave fabric in the warp and fill directions would be approximately 60/40 for general use but obviously larger ratios of 70/30 and greater would provide a higher degree of longitudinal sleeve integrity and fragmentation protection.

A number of procedures can be utilized in rigidly encasing the surge arrester conductive core of resistor units and terminal end pieces within the encasing jacket of plastic impregnated bi-directional weave fabric. The conductive core array may be conveniently held together in face-to-face stacked contact by conductive metal adhesive on the facing surfaces of the conductive core units or by non-conductive tape. One preferred procedure for encasing the conductive core within the fabric jacket is the conventional rolling procedure of placing the assembled conductive core array onto a pre-cut sheet of plastic impregnated, bi-directional weave fabric having a width equal to the length of the conductive core array with the fabric greater strength component (warp) along the width direction of the pre-cut sheet and rolling the conductive core array along the length of the fabric sheet of sufficient length as will establish a jacket of sufficient thickness to provide the desired bursting strength. Multiple circumferential windings comprising one or more continuous lengths of plastic impregnated high strength strands are wound under tension around the portion of the rolled sleeve jacket that overlies the curvelinear groove depressions of each terminal end piece and the assembled core then cured under heat in a mold. Alternately, dry unimpregnated fabric can be used in the rolling process along with unimpregnated terminal end circumscribing strands and the dry assembled unit placed in a mold into which plastic resin is injected to impregnate the jacket and constrictive end bands. In lieu of rolling, the conductor core could also be placed within a pre-formed sleeve jacket of impregnated or unimpregnated weave fabric and the assembled unit cured and impregnated if necessary after the terminal circumscribing end strands are installed. Although a multiple winding of high strength strands wound under tension around the jacket end portions is a preferred embodiment, obviously other varieties of constrictive end bands compressively circumscribing the encasing jacket in the region of the terminal end piece groove depressions could be substituted.

It should be understood that the foregoing disclosure describes typical preferred embodiments of the invention and that numerous modifications or alternatives may be made therein without departing from the spirit and scope of the invention as set forth in the appendant claims.

What is claimed is:

1. A non-fragmenting surge arrester core comprising an elongated inner conductive core enclosed within an outer plastic impregnated jacket of plastic impregnated bi-directional weave fabric woven of bi-directionally oriented strands of which the strands of one of said bi-directional orientations have greater tensile strength than the strands of the other of said bi-directional orientations, said greater tensile strength strands of said bi-directional weave fabric comprising said jacket extending longitudinally of said jacket and said strands of the other of said bi-directional orientations extending circumferentially of said jacket, the outer peripheral surface of said inner conductive core being bonded to said jacket along the length of said inner conductive core, said conductive core comprising a series array of non-linear resistor units stacked in face-to-face contact between inner end faces of a pair of terminal end pieces, said terminal end pieces having a circumferentially extending, groove depression in a peripheral region of said terminal end pieces between an outer end face of said terminal end piece and said terminal end piece inner end face and a constrictive band compressively circumscribing an area of said jacket overlaying each said terminal end piece groove depression.

2. The surge arrester of claim 1 wherein said terminal end piece groove depression includes a curvelinear surface of revolution.

3. The surge arrester of claim 1 wherein said weave fabric strands are fiberglass strands.

4. The surge arrester of claim 3 wherein the ratio of said fiberglass strands extending longitudinally and circumferentially of said jacket is greater than 55 to 45.

5. The surge arrester of claim 4 wherein said terminal end piece groove depression includes a curvelinear surface of revolution of moderate curvature.

6. In a surge arrester core comprising a series array of non-linear resistor units stacked in face-to-face contact between inner end faces of a pair of terminal end pieces and enclosed within and bonded to the inner surface of a circumscribing jacket of rigid reinforced plastic material, the improvement wherein:

said plastic reinforced material comprises a plastic impregnated, bi-directional weave fabric woven of bi-directionally oriented strands of which the strands of one of said bi-directional orientations have greater tensile strength than the strands of the other of said bi-directional orientations, said bi-directional weave fabric strands of greater tensile strength being arranged longitudinally of said jacket, said terminal end pieces each have a groove depression extending circumferentially of the periphery of said terminal end piece and a constrictive band compressively circumscribing an area of said jacket overlying each said terminal end piece groove depression.

7. The improved surge arrester of claim 6 wherein said constrictive band comprises multiple windings in overlying relationship of at least one continuous length of high tensile strength material under tension extending circumferentially of said jacket area overlying said terminal end piece groove depression.

8. The improved surge arrester of claim 7 wherein said bi-directional weave fabric strands are fiberglass.

9. The improved surge arrester of claim 8 wherein said constrictive band material comprises fiberglass strands.

10. A non-fragmenting surge arrester core adapted for insertion in the recess of an outer surge arrester housing, said core comprising an elongated conductive array comprising a series arrangement of at least one non-linear resistor unit stacked in face-to-face contact with the inner end surfaces of a pair of terminal end pieces, said conductive array being contained within a circumscribing jacket of plastic impregnated, bi-directional weave fabric woven of bi-directionally oriented strands of which the strands of one of said bi-directional orientations have greater tensile strength than the strands of the other of said bi-directional orientations, said bi-directional weave fabric strands of greater tensile strength extending longitudinally of said jacket, the peripheral surfaces of said conductive array being bonded to the inner surface of said jacket, and a high tensile strength constrictive band compressively circumscribing the portion of said jacket overlying a peripheral surface region of each said pair of terminal end pieces between an outer end face of said terminal end piece and said terminal piece inner end face.

11. The surge arrester of claim 10 wherein said terminal end piece peripheral surface region circumscribed by a constrictive band includes a longitudinal portion of said terminal end piece of reduced diameter contained within a curvelinear exterior surface.

* * * * *